United States Patent
Shao et al.

(10) Patent No.: US 12,537,297 B2
(45) Date of Patent: Jan. 27, 2026

(54) TRANSMISSION MECHANISM FOR BASE STATION ANTENNA

(71) Applicant: Outdoor Wireless Networks LLC, Claremont, NC (US)

(72) Inventors: Shuguang Shao, Suzhou (CN); PuLiang Tang, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 94 days.

(21) Appl. No.: 18/407,785

(22) Filed: Jan. 9, 2024

(65) Prior Publication Data

US 2024/0258692 A1  Aug. 1, 2024

(30) Foreign Application Priority Data

Jan. 30, 2023  (CN) .......................... 202320191586.9

(51) Int. Cl.
*H01Q 3/32* (2006.01)
*F16H 25/20* (2006.01)
*H01P 1/18* (2006.01)

(52) U.S. Cl.
CPC .............. *H01Q 3/32* (2013.01); *F16H 25/20* (2013.01); *F16H 2025/2031* (2013.01); *F16H 2025/204* (2013.01); *F16H 2025/2081* (2013.01); *H01P 1/18* (2013.01)

(58) Field of Classification Search
CPC .......... H01Q 1/246; H01Q 3/005; H01Q 3/32; F16H 25/20; F16H 25/2031; F16H 25/204; F16H 25/2081
See application file for complete search history.

(56) References Cited

FOREIGN PATENT DOCUMENTS

| CN | 112736467 A | * | 4/2021 | ............... H01Q 3/32 |
| CN | 114658822 A | * | 6/2022 | ............... H01Q 3/32 |

* cited by examiner

*Primary Examiner* — Robert Karacsony
(74) *Attorney, Agent, or Firm* — Myers Bigel, P.A.

(57) ABSTRACT

The present disclosure relates to a transmission mechanism for a base station antenna, including: a motor having an output shaft; a gear assembly including a first gear and a second gear meshed with each other, an output end of the output shaft connected to the first gear and driving the first gear to rotate; a screw, a first end thereof connected to the second gear and a second end thereof rotatably supported by a support element; a movable element mounted on the screw, fixedly connected to one end of a connecting rod and translating along an axial direction of the screw when the screw rotates, thereby driving the connecting rod to translate along the axial direction; and an anti-rotation element configured to cooperate with the movable element to prevent the movable element from rotating with the screw, where the motor and the screw are configured to be arranged parallel to each other on a same side of the gear assembly. The transmission mechanism of the present disclosure can have a smaller length, can provide greater axial force to the connecting rod, and/or can be assembled and disassembled more quickly.

17 Claims, 8 Drawing Sheets

{PRIOR ART}

TRANSMISSION MECHANISM FOR BASE STATION ANTENNA

RELATED APPLICATION

The present application claims priority from and the benefit of Chinese Utility Model Application No. 202320191586.9, filed Jan. 30, 2023, the disclosure of which is hereby incorporated herein by reference in full.

TECHNICAL FIELD

The present disclosure generally relates to a communication system. More particularly, the present disclosure relates to a transmission mechanism that may be used for a base station antenna, which is configured to adjust a remote electrical tilt angle of a phase shifter of the base station antenna.

BACKGROUND ART

A cellular communication system is used to provide wireless communication to stationary and mobile users. The cellular communication system may include a plurality of base stations, and each base station provides a wireless cellular service for a designated coverage area (generally referred to as a "cell"). Each base station may include one or more base station antennas, and the base station antenna is used to transmit radio frequency ("RF") signals to a user located in a cell served by the base station and receive RF signals from the user. The base station antenna is a directional device that can converge RF energy transmitted in certain directions or received from certain directions.

A modern base station antenna usually includes two, three or more linear (or planar) arrays of radiating elements, where each linear array has an electronically adjustable down tilt angle. The linear array usually includes a cross-polarized radiating element, and is provided with a separate phase shifter for electronically adjusting the down tilt angle of antenna beams for each polarization, so that the antenna can include twice the phase shifters of the linear array. A remote electrical tilt ("RET") actuator and an associated transmission mechanism may be provided in the antenna to adjust the phase shifter.

With the development of communication technologies, there is an increasing demand for small base station antennas in the market. Because small base station antennas have smaller interior spaces, it is desirable to have as small a RET actuator as possible as well as a transmission mechanism associated therewith.

SUMMARY

One of objectives of the present disclosure is to provide a transmission mechanism for a base station antenna that can have a smaller length than that of an existing transmission mechanism, can provide greater axial force to a connecting rod, and/or can be assembled and disassembled more quickly.

In a first aspect of the present disclosure, a transmission mechanism for a base station antenna is provided. The transmission mechanism includes: a motor having an output shaft; a gear assembly including a first gear and a second gear meshed with each other, where an output end of the output shaft is connected to the first gear and drives the first gear to rotate; a screw, where a first end of the screw is connected to the second gear and a second end of the screw is rotatably supported by a support element so that the screw is rotatable under driving of the second gear; a movable element mounted on the screw, the movable element being fixedly connected to one end of a connecting rod and configured to translate along an axial direction of the screw when the screw rotates, thereby driving the connecting rod to translate along the axial direction; and an anti-rotation element configured to cooperate with the movable element to prevent the movable element from rotating with the screw; where the motor and the screw are configured to be arranged parallel to each other on a same side of the gear assembly.

According to an embodiment of the present disclosure, a ratio of a number of teeth of the second gear to a number of teeth of the first gear is configured to be greater than 1.

According to an embodiment of the present disclosure, the output end of the output shaft and the first end of the screw have a non-circular cross-section, and the first gear and the second gear each have central openings corresponding to the output end of the output shaft and the first end of the screw, respectively.

According to an embodiment of the present disclosure, the transmission mechanism further includes a mounting plate, where at least one of the motor, the gear assembly, the support element and the anti-rotation element is fixedly mounted on the mounting plate.

According to an embodiment of the present disclosure, the gear assembly includes a gear housing including a first housing portion for rotatably receiving the first gear and the second gear therein and a second housing portion for closing the gear housing.

According to an embodiment of the present disclosure, the mounting plate is provided with a first opening for receiving at least a portion of the gear assembly, two sides of the first opening have a first plate portion and a second plate portion, respectively, and two sides of the bottom of the gear assembly are provided with a first chute for receiving the first plate portion and a second chute for receiving the second plate portion, respectively.

According to an embodiment of the present disclosure, the mounting plate is provided with a second opening for receiving at least a portion of the support element.

According to an embodiment of the present disclosure, the second opening of the mounting plate includes a longitudinal opening portion extending along a longitudinal direction of the mounting plate, a transverse opening portion extending along a transverse direction of the mounting plate, and an intermediate opening portion disposed between the longitudinal opening portion and the transverse opening portion and connecting the longitudinal opening portion and the transverse opening portion; where the bottom of the support element is provided with a first positioning component extending vertically downward from a bottom surface of the support element and at least one second positioning component extending horizontally outward from a side surface of the support element, where at least a portion of the first positioning component is capable of being positioned in the longitudinal opening portion of the second opening of the mounting plate and at least a portion of the second positioning component is capable of being positioned in the transverse opening portion of the second opening of the mounting plate.

According to an embodiment of the present disclosure, the first positioning component includes a vertically extending portion and a horizontally extending portion at one end of the vertically extending portion, where the horizontally extending portion of the first positioning component is capable of reaching below the mounting plate through the intermediate opening portion of the second opening of the mounting plate, and the vertically extending portion of the first positioning component is capable of being positioned in the longitudinal opening portion of the second opening of the mounting plate.

According to an embodiment of the present disclosure, the second positioning component is configured as a cantilevered elastic component and a free end of the second positioning component has a thickness greater than a thickness of a fixed end of the second positioning component, so that at least a portion of the free end of the second positioning component is capable of extending into the transverse opening portion of the second opening of the mounting plate.

According to an embodiment of the present disclosure, the anti-rotation element is configured as a slide rail, and the slide rail includes a body extending along a longitudinal direction, where the body is provided with a slot extending along the longitudinal direction, and at least a portion of the movable element is provided in the slot.

According to an embodiment of the present disclosure, the bottom of the movable element is provided with a protrusion capable of extending into the slot, the protrusion is flat and a thickness of the protrusion is basically equal to a width of the slot.

According to an embodiment of the present disclosure, the anti-rotation element is configured as a slide rail, and the slide rail comprises a body extending in a longitudinal direction, wherein the body is provided with a slot extending in the longitudinal direction, at least a portion of the movable element is provided in the slot, and a bottom surface of the body is provided with one or more snap elements to snap the anti-rotation element on the mounting plate.

In a second aspect of the present disclosure, a transmission mechanism for a base station antenna is provided. The transmission mechanism includes: a motor having an output shaft; a gear assembly including a first gear and a second gear meshed with each other, where an output end of the output shaft is connected to the first gear and drives the first gear to rotate; a screw, where a first end of the screw is connected to the second gear and a second end of the screw is rotatably supported by a support element so that the screw is rotatable under driving of the second gear; and a movable element mounted on the screw, the movable element being fixedly connected to one end of a connecting rod and configured to translate along an axial direction of the screw when the screw rotates, thereby driving the connecting rod to translate along the axial direction; where the motor and the screw are configured to be arranged parallel to each other on a same side of the gear assembly; and a ratio of a number of teeth of the second gear to a number of teeth of the first gear is configured to be greater than 1.

In a third aspect of the present invention, a transmission mechanism for a base station antenna is provided. The transmission mechanism includes: a motor having an output shaft; a gear assembly including a first gear and a second gear meshed with each other, where an output end of the output shaft is connected to the first gear and drives the first gear to rotate; a screw, where a first end of the screw is connected to the second gear and a second end of the screw is rotatably supported by a support element so that the screw is rotatable under driving of the second gear; a movable element mounted on the screw, the movable element being fixedly connected to one end of a connecting rod and configured to translate along an axial direction of the screw when the screw rotates, thereby driving the connecting rod to translate along the axial direction; and a mounting plate, where at least one of the motor, the gear assembly, and the support element is fixedly mounted on the mounting plate; where the motor and the screw are configured to be arranged parallel to each other on a same side of the gear assembly; and where the mounting plate is provided with a first opening for receiving at least a portion of the gear assembly and a second opening for receiving at least a portion of the support element.

According to an embodiment of the present disclosure, two sides of the first opening of the mounting plate have a first plate portion and a second plate portion, respectively, and two sides of the bottom of the gear assembly are respectively provided with a first chute for receiving the first plate portion and a second chute for receiving the second plate portion.

According to an embodiment of the present disclosure, the second opening of the mounting plate includes a longitudinal opening portion extending along a longitudinal direction of the mounting plate, a transverse opening portion extending along a transverse direction of the mounting plate, and an intermediate opening portion disposed between the longitudinal opening portion and the transverse opening portion and connecting the longitudinal opening portion and the transverse opening portion; where the bottom of the support element is provided with a first positioning component extending vertically downward from a bottom surface of the support element and at least one second positioning component extending horizontally outward from a side surface of the support element, where at least a portion of the first positioning component is capable of being positioned in the longitudinal opening portion of the second opening of the mounting plate and at least a portion of the second positioning component is capable of being positioned in the transverse opening portion of the second opening of the mounting plate.

According to an embodiment of the present disclosure, the first positioning component includes a vertically extending portion and a horizontally extending portion at one end of the vertically extending portion, where the horizontally extending portion of the first positioning component is capable of reaching below the mounting plate through the intermediate opening portion of the second opening of the mounting plate, and the vertically extending portion of the first positioning component is capable of being positioned in the longitudinal opening portion of the second opening of the mounting plate; where the second positioning component is configured as a cantilevered elastic component and a free end of the second positioning component has a thickness greater than a thickness of a fixed end of the second positioning component, so that at least a portion of the free end of the second positioning component is capable of extending into the transverse opening portion of the second opening of the mounting plate.

It should be noted that various aspects of the present disclosure described for one embodiment may be included in other different embodiments, even though specific description is not made for the other different embodiments. In other words, all the embodiments and/or features of any embodiment may be combined in any manner and/or combination, as long as they are not contradictory to each other.

BRIEF DESCRIPTION OF THE ATTACHED DRAWINGS

A plurality of aspects of the present disclosure will be better understood after reading the following specific embodiments with reference to the attached drawings. Among the attached drawings.

It should be understood that in all the attached drawings, the same symbols denote the same elements. In the attached drawings, for clarity, the size of certain feature is not drawn to scale as it may change.

DETAILED DESCRIPTION OF SPECIFIC EMBODIMENTS

Figure 1:
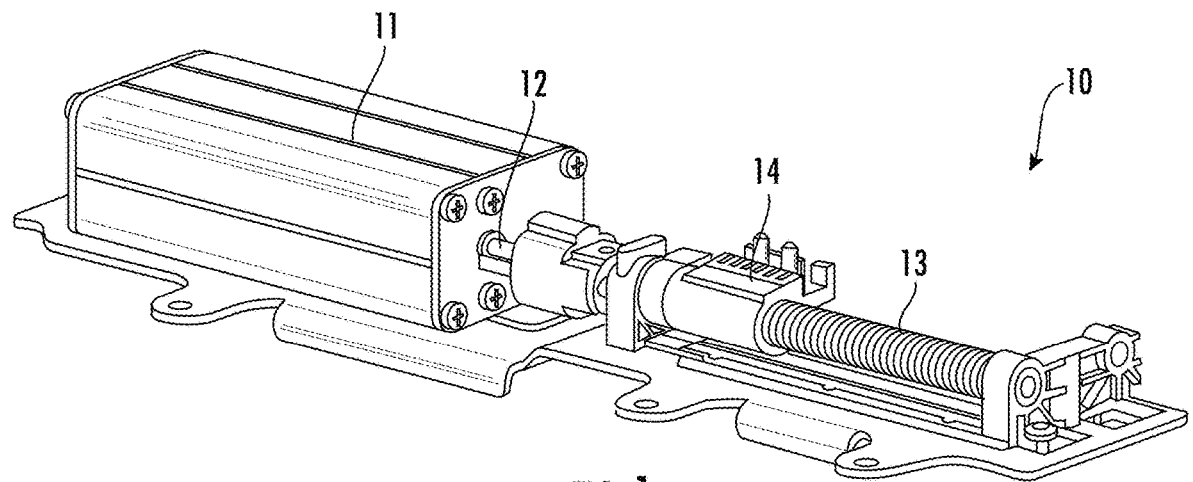
FIG. 1 is a perspective view of a transmission mechanism for a base station antenna in the prior art.

The present disclosure will be described below with reference to the attached drawings, and the attached drawings illustrate certain embodiments of the present disclosure. However, it should be understood that the present disclosure may be presented in many different ways and is not limited to the embodiments described below; in fact, the embodiments described below are intended to make the content of the present disclosure more complete and to fully explain the protection scope of the present disclosure to those skilled in the art. It should also be understood that the embodiments disclosed in the present disclosure may be combined in various ways so as to provide more additional embodiments.

It should be understood that the words in the Specification are only used to describe specific embodiments and are not intended to limit the present disclosure. Unless otherwise defined, all terms (including technical terms and scientific terms) used in the Specification have the meanings commonly understood by those skilled in the art. For brevity and/or clarity, well-known functions or structures may not be further described in detail.

The singular forms "a", "an", "the" and "this" used in the Specification all include plural forms unless clearly indicated. The words "include", "contain" and "have" used in the Specification indicate the presence of the claimed features, but do not exclude the presence of one or a plurality of other features. The word "and/or" used in the Specification includes any or all combinations of one or a plurality of the related listed items.

In the Specification, when it is described that an element is "on" another element, "attached" to another element, "connected" to another element, "coupled" with another element, or "in contact with" another element, etc., the element may be directly on another element, attached to another element, connected to another element, coupled with another element, or in contact with another element, or an intermediate element may be present.

In the Specification, the terms "first", "second", "third", etc. are only used for convenience of description and are not intended for limitation. Any technical features represented by "first", "second", "third", etc. are interchangeable.

In the Specification, terms expressing spatial relations such as "upper", "lower", "front", "rear", "top", and "bottom" may describe the relation between one feature and another feature in the attached drawings. It should be understood that, in addition to the positions shown in the attached drawings, the words expressing spatial relations further include different positions of a device in use or operation. For example, when a device in the attached drawings is turned upside down, the features originally described as being "below" other features now can be described as being "above" the other features". The device may also be oriented by other means (rotated by 90 degrees or at other positions), and at this time, a relative spatial relation will be explained accordingly.

FIG. 1 shows a transmission mechanism 10 for a base station antenna in the prior art, which generally includes a motor 11 having an output shaft 22 and a screw 13 connected to the output shaft 12 to be driven by the output shaft 12 to rotate. A movable element 14 is mounted on the screw 13 and configured to translate along an axial direction of the screw 13 as the screw 13 rotates, thereby translating a connecting rod connected to the movable element 14 and adjusting a remote electrical tilt angle of a phase shifter of the base station antenna. In the transmission mechanism 10 shown in FIG. 1, the motor 11, the output shaft 12, and the screw 13 are arranged sequentially along the axial direction such that the length of the transmission mechanism 10 is greater. Such a transmission mechanism 10 is difficult to adapt to miniaturization needs of base station antennas. Therefore, there is a need for a transmission mechanism that can be adapted to a small base station antenna.

Figure 2:
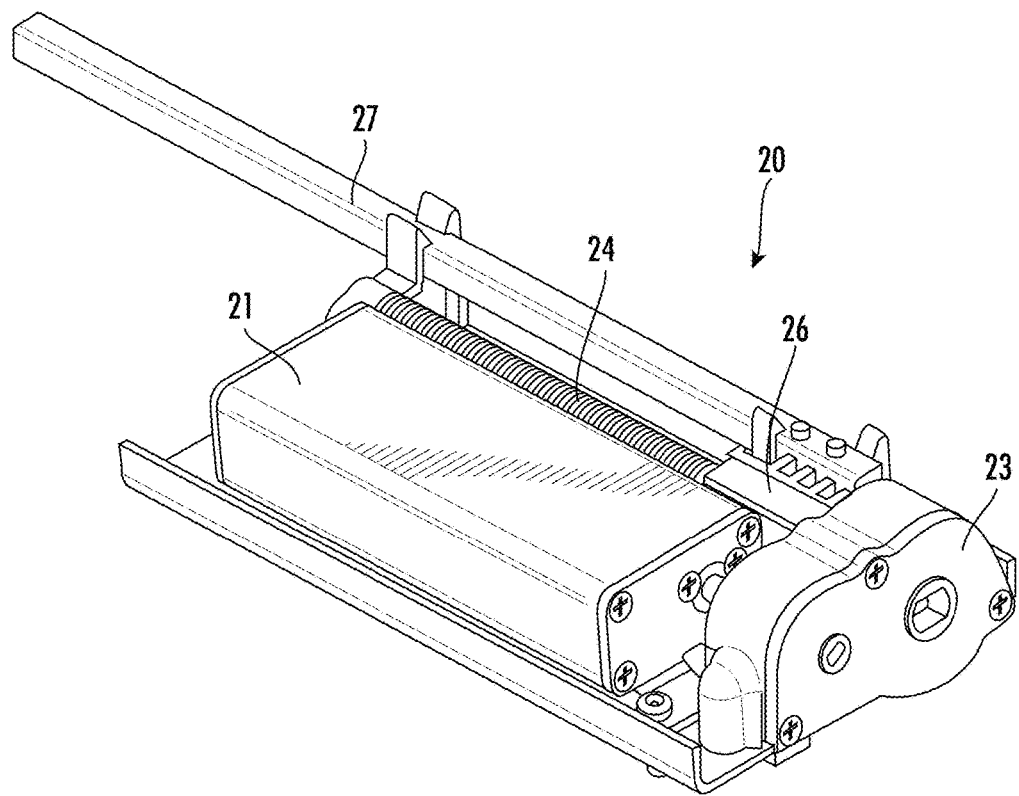
FIG. 2 is a perspective view of a transmission mechanism for a base station antenna according to an embodiment of the present disclosure.
Figure 3:
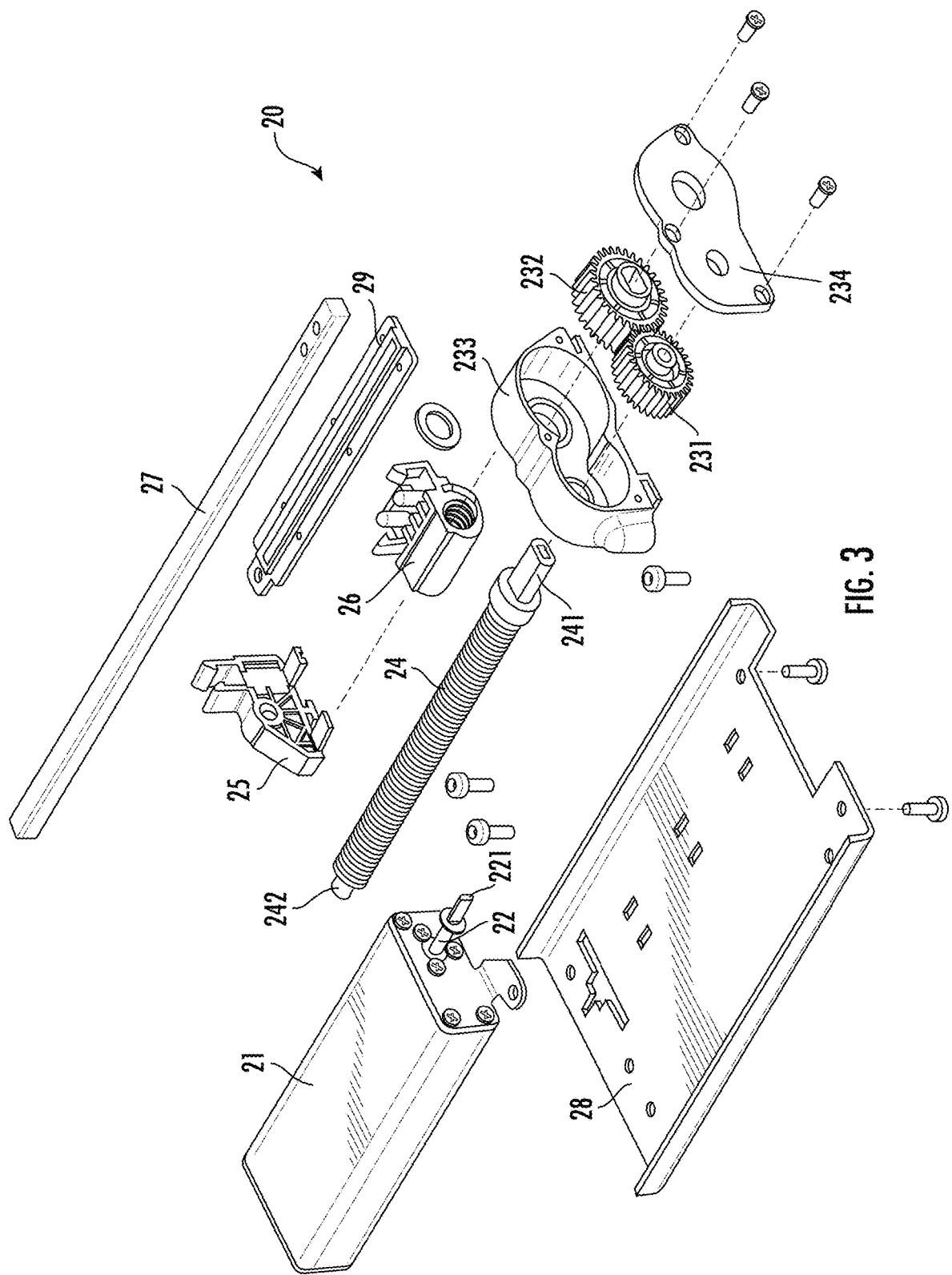
FIG. 3 is an exploded view of the transmission mechanism shown in FIG. 2.

Referring to FIG. 2 and FIG. 3, which show a transmission mechanism 20 according to an embodiment of the present disclosure. The transmission mechanism 20 may include a motor 21 having an output shaft 22, a gear assembly 23, and a screw 24. The gear assembly 23 may include a first gear 231 and a second gear 232 meshed with each other. An output end 221 of the output shaft 22 may be connected to the first gear 231 and drive the first gear 231 to rotate, thereby causing the second gear 232 to rotate under driving of the first gear 231. A first end 241 of the screw 24 may be connected to the second gear 232, and a second end 242 of the screw 24 may be rotatably supported by a support element 25, thereby enabling the screw 24 to rotate under driving of the second gear 232. The screw 24 is mounted with a movable element 26. The moveable element 26 may be fixedly connected to one end of a connecting rod 27 and configured to translate along an axial direction of the screw 24 as the screw 24 rotates, thereby driving the connecting rod 27 to translate along the axial direction. The other end of the connecting rod 27 may be connected to an adjusting element of a phase shifter, so that translation of the connecting rod 27 can adjust a remote electrical tilt angle of the phase shifter of the base station antenna. In an embodiment according to the present disclosure, the transmission mechanism 20 may further include a mounting plate 28. The motor 21, the gear assembly 23, and the support element 25 may be fixedly mounted on the mounting plate 28.

Referring to FIG. 2, in the transmission mechanism 20 according to the present disclosure, the motor 21 and the screw 24 may be configured to be arranged parallel to each other on a same side of the gear assembly 23, which makes the transmission mechanism 20 according to the present disclosure have a significantly shortened length compared to that of the existing transmission mechanism 10. For example, the length of the transmission mechanism 20 according to the present disclosure may be 50% or less of the length of the existing transmission mechanism 10. In this way, the transmission mechanism 20 according to the present disclosure can occupy a smaller space in a small base station antenna, and thus provide more remaining space for other components of the base station antenna.

In an embodiment according to the present disclosure, torque exerted on the screw 24 by the motor 21 may be amplified by the gear assembly 23, thereby enabling an increased axial force (e.g., axial thrust and axial pull) to be applied to the connecting rod 27 via the movable element 26. In this way, the transmission mechanism 20 according to the present disclosure can use a smaller power motor 21 to drive the same phase shifter compared with the existing transmission mechanism 10. In particular, the transmission ratio of the gear assembly 23 (i.e.: the ratio of the number of teeth of the second gear 232 to the number of teeth of the first gear 231, or the ratio of the speed of the first gear 231 to the speed of the second gear 232) is configured to be greater than 1 to amplify the torque exerted on the screw 24 by the motor 21. Depending on actual needs, the transmission ratio of the gear assembly 23 may be configured to be 1.5:1 or greater, such as 2:1, 2.5:1, 3:1, etc.

Where the transmission ratio of the gear assembly 23 is configured to be greater than 1, the rotational speed of the second gear 232 will be less than the rotational speed of the output shaft 22 of the motor 21 and the first gear 231, so that the screw 24 can have a rotational speed less than that of the output shaft 22 of the motor 21. The smaller rotational speed of the screw 24 enables more precise adjustment of the remote electrical tilt of the phase shifter, thereby improving adjustment accuracy of the phase shifter.

In an embodiment according to the present disclosure, as shown in FIG. 2 and FIG. 3, the gear assembly 23 may also include a gear housing. The gear housing may include a first housing portion 233 for rotatably receiving the first gear 231 and the second gear 232 therein and a second housing portion 234 for closing the gear housing. As shown in FIG. 3, the second housing portion 234 may be a cover plate. The second housing portion 234 may be removably fixed to the first housing portion 233 with a fixing element (e.g., a screw).

Figure 4:
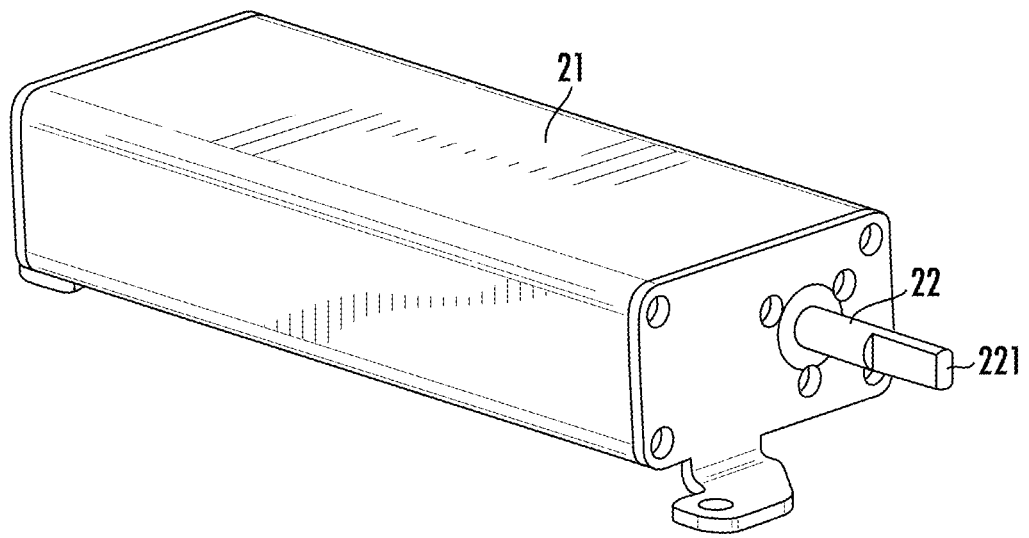
FIG. 4 is a perspective view of a motor of the transmission shown in FIG. 2 and an output shaft connected to the motor.
Figure 5:
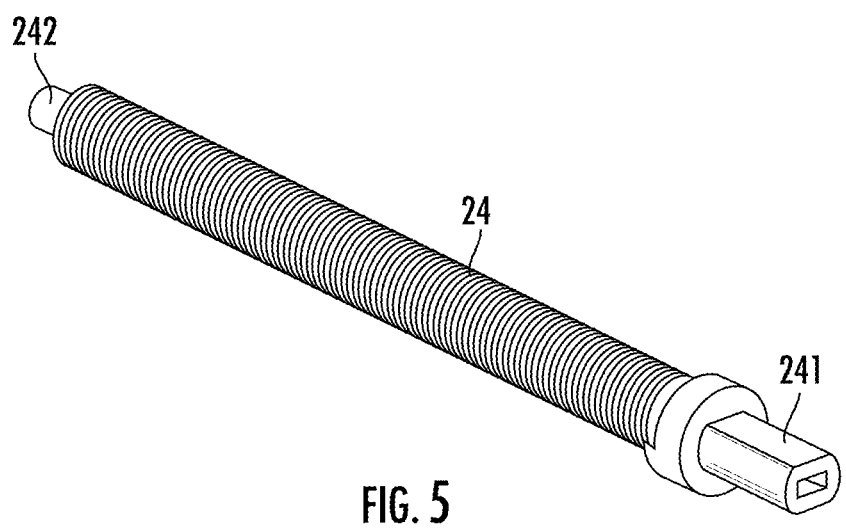
FIG. 5 is a perspective view of a screw of the transmission mechanism shown in FIG. 2.
Figure 6:
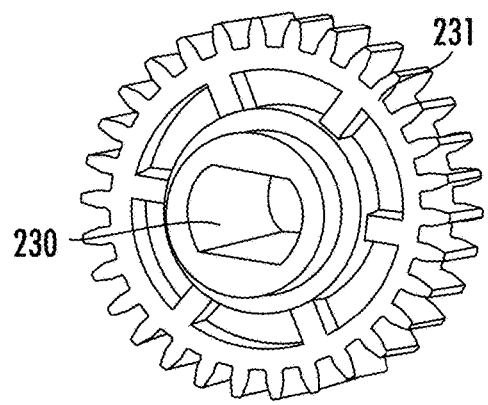
FIG. 6 is a perspective view of a gear of the transmission mechanism shown in FIG. 2.

Referring to FIG. 4 to FIG. 6, in an embodiment according to the present disclosure, in order to realize a quick connection of the output shaft 22 and the screw 24 with the first gear 231 and the second gear 232 of the gear assembly 23, respectively, the output end 221 of the output shaft 22 and the first end 241 of the screw 24 may each have a shape with a non-circular cross-section (e.g., oval, rectangular, diamond, pentagonal, hexagonal, heptagonal, octagonal, or a flattened shape as shown in FIG. 4 and FIG. 5). Accordingly, the first gear 231 and the second gear 232 each have a central opening 230 shaped to correspond to the output end of the output shaft 22 and the first end of the screw 24 to receive the output end 221 of the output shaft 22 and the first end 241 of the screw 24. Such a configuration enables a quick plug connection of the output shaft 22 and the screw 24 with the first gear 231 and the second gear 232, respectively.

Next, referring to FIG. 7 to FIG. 10, when the transmission mechanism 20 includes a mounting plate 28, the mounting plate 28 may be provided with a first opening 280 for receiving at least a portion of the gear assembly 23 to enable quick mounting and/or removal of the gear assembly 23 on the mounting plate 28. Both sides of the first opening 280 have a first plate portion 281 and a second plate portion 282, respectively. Accordingly, both sides of the bottom of the gear assembly 23 (e.g., both sides of the bottom of the first housing portion 233 of the gear housing) are respectively provided with a first chute 235 for receiving the first plate portion 281 and a second chute 236 for receiving the second plate portion 282. When it is necessary to mount the gear assembly 23 on the mounting plate 28, assembly only requires pushing the gear assembly 23 in a horizontal direction to receive the first plate portion 281 and the second plate portion 282 of the mounting plate 28 in the first and second chutes 235, 236 of the first housing portion 233 of the gear housing of the gear assembly 23, respectively. After the gear assembly 23 is mounted in place on the mounting plate 28, the gear assembly 23 may also be further fixed on the mounting plate 28 using a fixing element (e.g., a screw).

Figure 7:
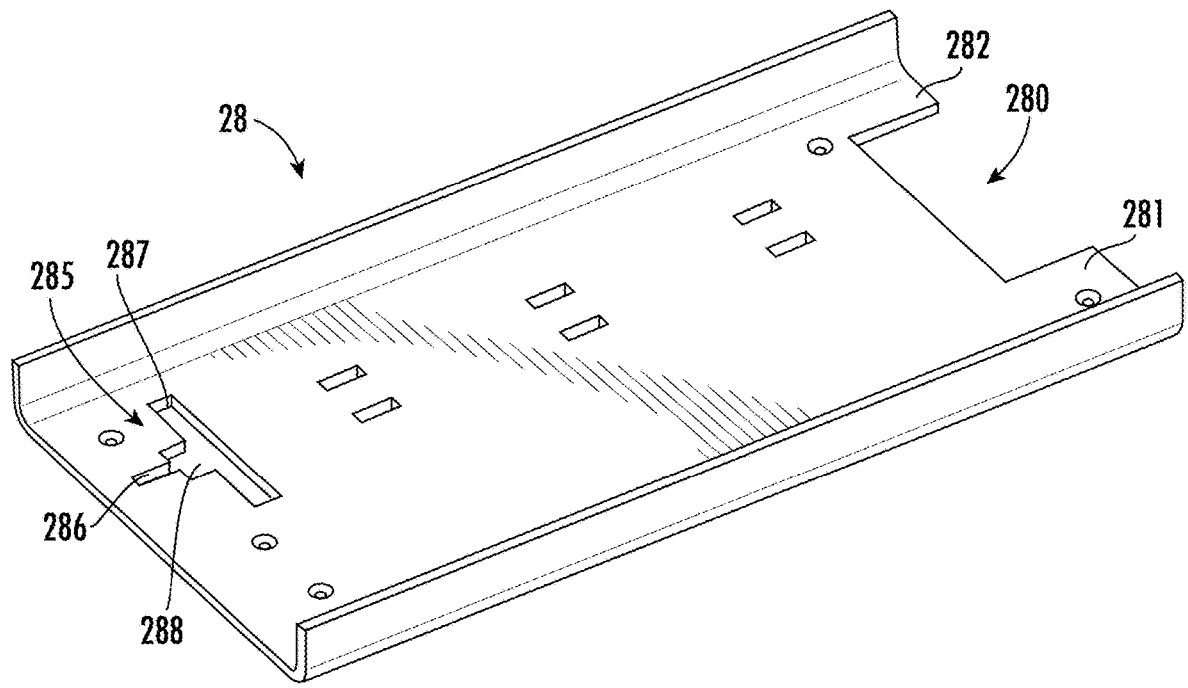
FIG. 7 is a perspective view of a mounting plate of the transmission mechanism shown in FIG. 2.
Figure 8:
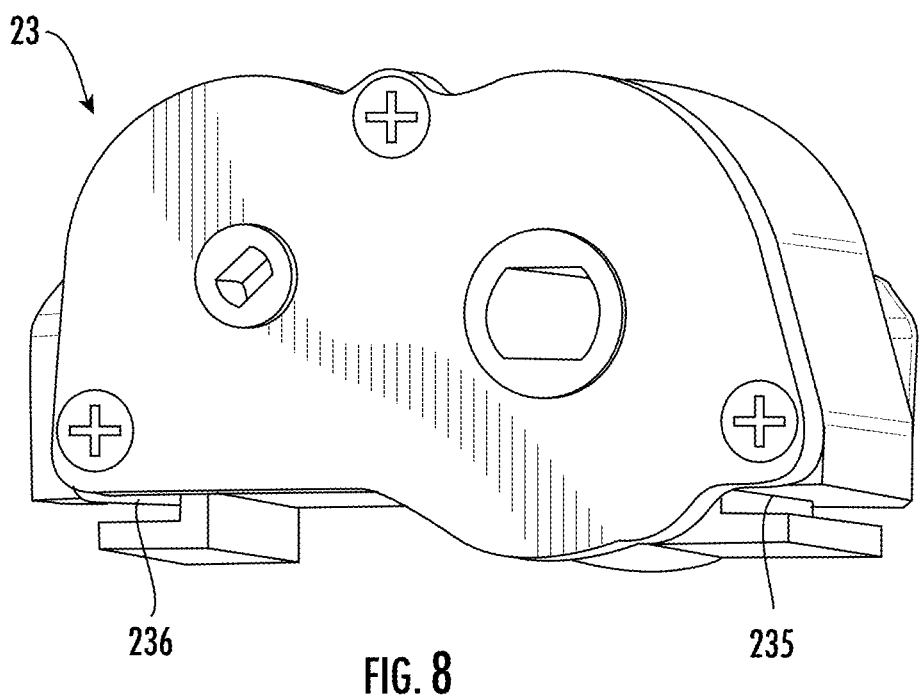
FIG. 8 is a perspective view of a housing of a gear assembly of the transmission mechanism shown in FIG. 2.
Figure 9:
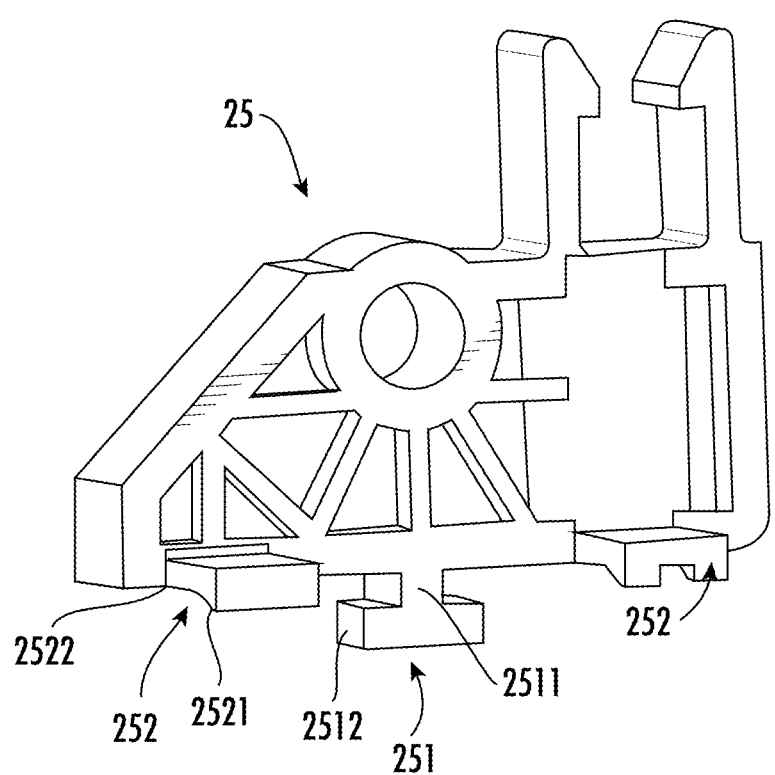
FIG. 9 is a perspective view of a support element of the transmission mechanism shown in FIG. 2.

In addition, in order to realize quick mounting and/or removal of the support element 25 on the mounting plate 28, as shown in FIG. 7, the mounting plate 28 may also be provided with a second opening 285 for receiving at least a portion of the support element 25. The second opening 285 may include: a longitudinal opening portion 286 extending along a longitudinal direction of the mounting plate 28 (i.e.: a length direction of the mounting plate), a transverse opening portion 287 extending along a transverse direction of the mounting plate 28 (i.e.: a width direction of the mounting plate), and an intermediate opening portion 288 disposed between the longitudinal opening portion 286 and the transverse opening portion 287 and connecting the longitudinal opening portion 286 and the transverse opening portion 287. As shown in FIG. 7, the intermediate opening portion 288 has a greater width than that of the longitudinal opening portion 286. Accordingly, the bottom of the support element 25 is provided with a first positioning component 251 extending vertically downward from a bottom surface of the support element 25 and at least one second positioning component 252 extending horizontally outward from a side surface of the support element 25. The first positioning component 251 includes a vertically extending portion 2511 and a horizontally extending portion 2512 located at one end of the vertically extending portion 2511, such that the first positioning component 251 is in an inverted "T" shape. The horizontally extending portion 2512 of the first positioning component 251 can reach below the mounting plate 285 through the intermediate opening portion 288 of the second opening 285 of the mounting plate 28. The vertically extending portion 2511 of the first positioning component 251 is capable of being positioned in the longitudinal opening portion 286 of the second opening 285 of the mounting plate 28. The second positioning component 252 may be configured as a cantilevered elastic component, and a free end 2521 of the second positioning component 252 has a thickness greater than a thickness of a fixed end 2522 of the second positioning component 252, such that at least a portion of the free end 2521 of the second positioning component 252 can extend into the transverse opening portion 287 of the second opening 285 of the mounting plate 28 to prevent horizontal movement of the support element 25 relative to the mounting plate 28.

Figure 10:
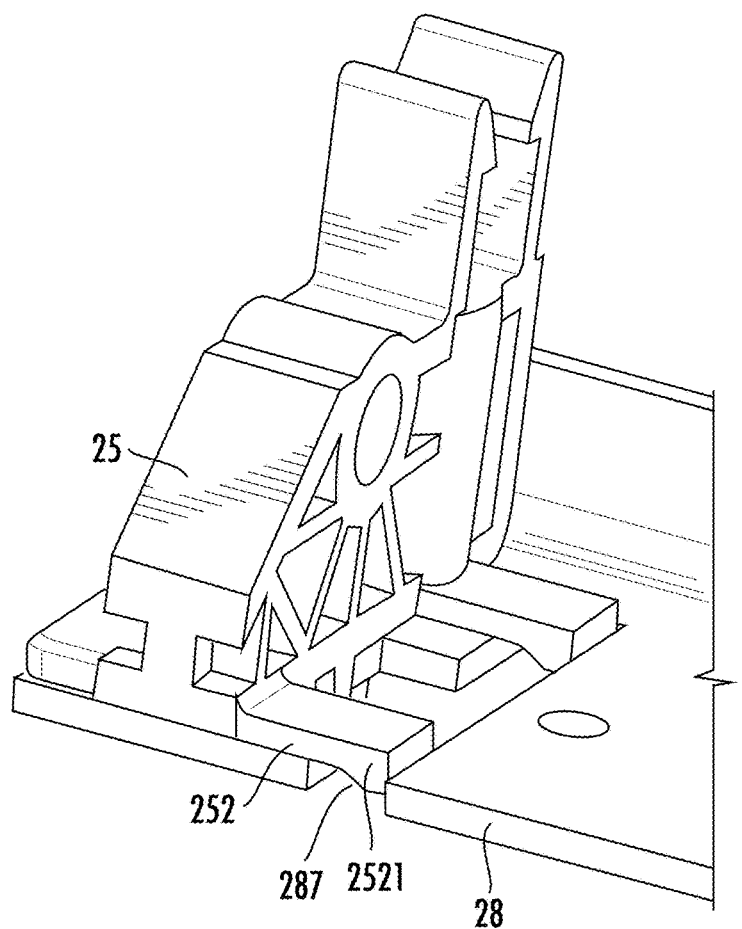
FIG. 10 is a perspective view of the support element shown in FIG. 9 fixed to the mounting plate shown in FIG. 7.

When the support element 25 needs to be mounted on the mounting plate 28, the first positioning component 251 of the support element 25 may first be inserted downward in the vertical direction into the intermediate opening portion 288 of the second opening 285 of the mounting plate 28, such that the horizontally extending portion 2512 of the first positioning component 251 is located below the mounting plate 28. The support element 25 is then moved horizontally to position the vertically extending portion 2511 of the first positioning component 252 of the support element 25 in the longitudinal opening portion 286 of the second opening 285 of the mounting plate 28. In this case, at least a portion of the free end 2521 of the second positioning component 252 of the support element 25 may extend into the transverse opening portion 287 of the second opening 285 of the mounting plate 28 (as shown in FIG. 10) to prevent horizontal movement of the support element 25 relative to the mounting plate 28. In this way, the support element 25 can be quickly mounted to the mounting plate 28. After the support element 25 is mounted in place on the mounting plate 28, the support element 25 may also be further fixed on the mounting plate 28 using a fixing element (e.g., a screw).

Figure 11:
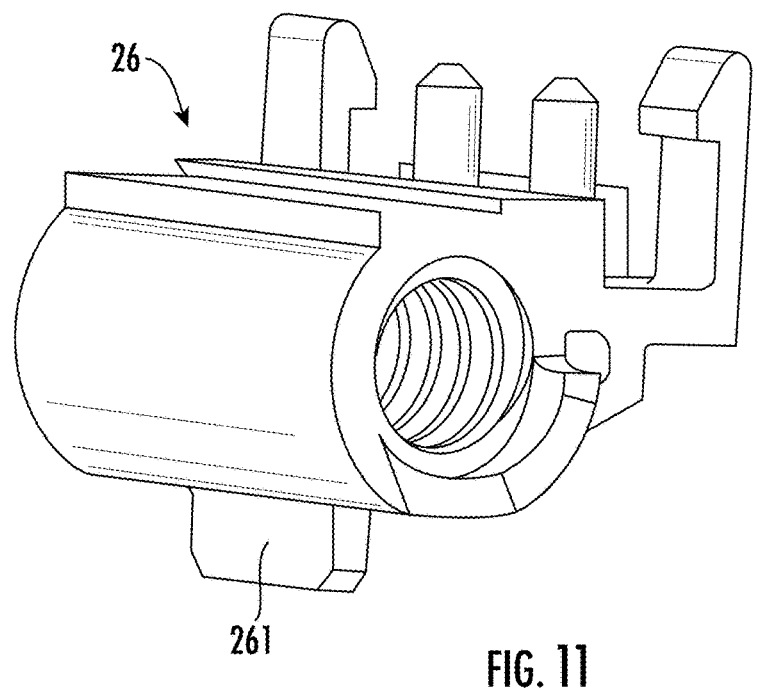
FIG. 11 is a perspective view of a movable element of the transmission mechanism shown in FIG. 2.
Figure 12:
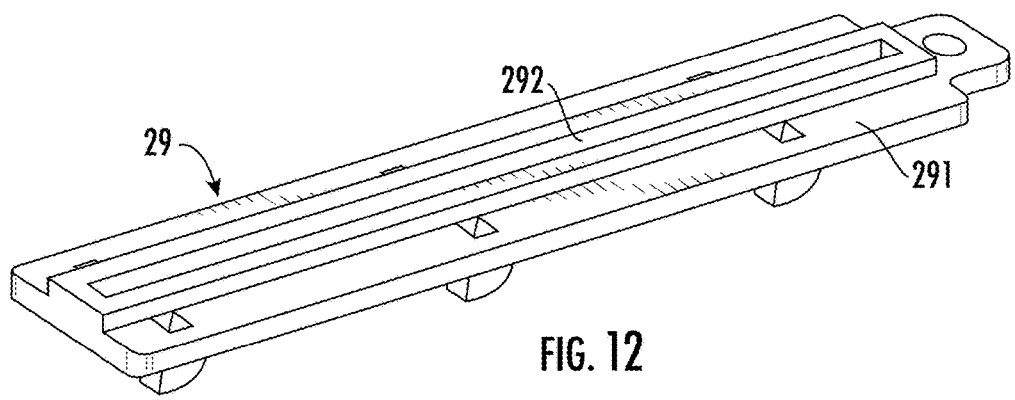
FIG. 12 is a perspective view of an anti-rotation element of the transmission mechanism shown in FIG. 2.
Figure 13:
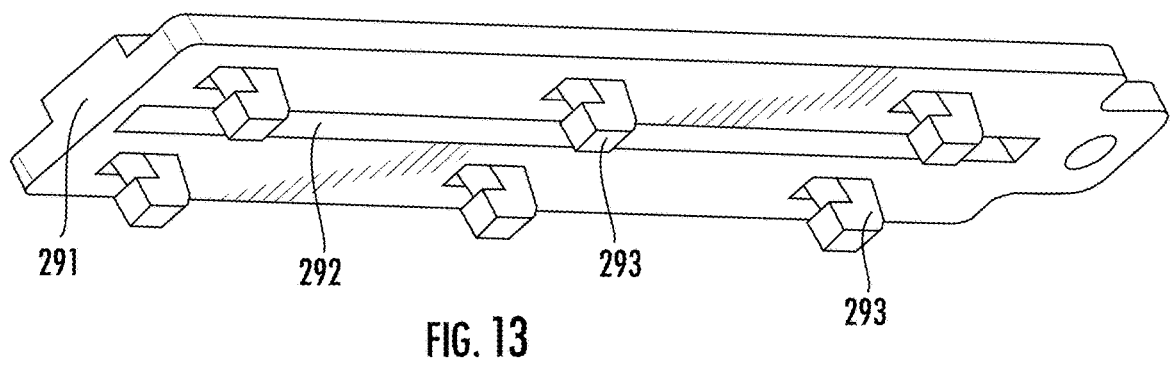
FIG. 13 is a perspective view of the anti-rotation element shown in FIG. 12 viewed from another angle.
Figure 14:
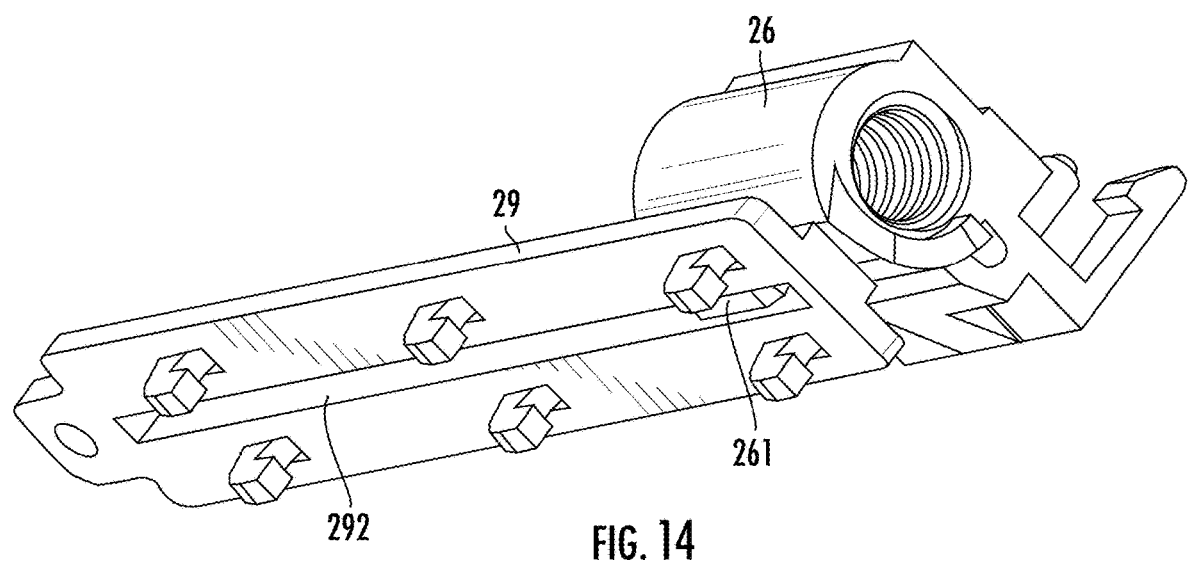
FIG. 14 and FIG. 15 are perspective views illustrating interaction between the movable element shown in FIG. 11 and the anti-rotation element shown in FIG. 12.
Figure 15:
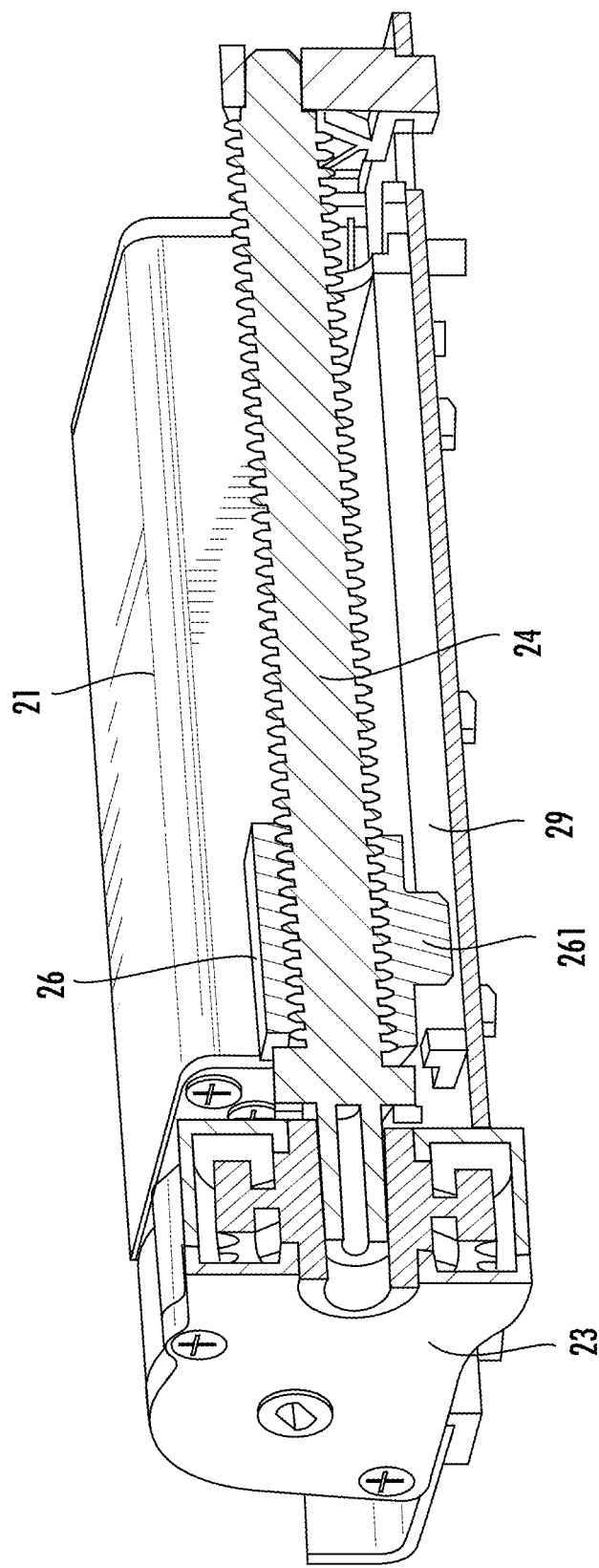

Next, referring to FIG. 3 and FIG. 11 to FIG. 15, in an embodiment according to the present disclosure, in order to prevent the movable element 26 from rotating synchronously with the screw 24 when the screw 24 rotates, the transmission mechanism 20 according to the present disclosure is also provided with an anti-rotation element 29. In some embodiments, the anti-rotation element 29 may be configured as a slide rail. As shown in FIG. 12, the anti-rotation element 29 may include a body 291 extending along the longitudinal direction. The body 291 is provided with a slot 292 having a predetermined length. The slot 292 may extend along the longitudinal direction of the body 291, and in some embodiments may extend through the entire thickness of the body 291. Correspondingly, as shown in FIG. 11, the bottom of the movable element 26 may be provided with a protrusion 261. The protrusion 261 may be inserted into the slot 292 of the anti-rotation element 29 (as shown in FIG. 14 and FIG. 15) such that the movable element 26 translates relative to the anti-rotation element 29 without rotating with the screw 24. Preferably, the protrusion 261 may be configured as being flat-plate, which may have a thickness that is substantially equal to or slightly smaller than the width of the slot 292, such that the protrusion 261 can be inserted into the slot 292 but not oscillate left and right in the slot 292.

In an embodiment according to the present disclosure, as shown in FIG. 13 and FIG. 14, the bottom surface of the body 291 of the anti-rotation element 29 may be provided with one or more snap elements 293. The anti-rotation element 29 may be quickly snapped onto the mounting plate 28 by means of the snap 293. However, the present disclosure is not limited thereto. The anti-rotation element 29 may not include the snap element 293. In this case, the anti-rotation element 29 may be fixed to the mounting plate 28 by means of a fixing element (e.g., a screw).

In other embodiments according to the present disclosure, a separately disposed anti-rotation element 29 may not be included. For example, the slot 292 may be disposed directly in the mounting plate 28 such that the protrusion 261 of the movable element 26 extends into the slot 292 in the mounting plate 28 to prevent it from rotating with the screw 24. In other embodiments according to the present disclosure, the bottom of the movable element 26 may not include a protrusion, but rather include a slot. An elongate rib provided on the mounting plate 28 may extend into the slot at the bottom of the movable element 26 to prevent rotation of the movable element 26. In other embodiments according to the present disclosure, when the base station antenna does not include the mounting plate 28, the slot 292 or the elongated rib may be provided in another component of the base station antenna to cooperate with the movable element 26 to prevent the movable element 26 from rotating with the screw 24.

Exemplary embodiments according to the present disclosure have been described above with reference to the attached drawings. However, those of ordinary skill in the art should understand that various changes and modifications can be made to the exemplary embodiments of the present disclosure without departing from the gist and scope of the present disclosure. All changes and modifications are included in the protection scope of the present disclosure defined by the claims. The present disclosure is defined by the attached claims, and equivalents of these claims are also included.

The invention claimed is:

1. A transmission mechanism for a base station antenna, wherein the transmission mechanism comprises:
   a motor having an output shaft;
   a gear assembly comprising a first gear and a second gear meshed with each other, wherein an output end of the output shaft is connected to the first gear and drives the first gear to rotate;
   a screw, wherein a first end of the screw is connected to the second gear and a second end of the screw is rotatably supported by a support element so that the screw is rotatable under driving of the second gear;
   a movable element mounted on the screw, the movable element being fixedly connected to one end of a connecting rod and configured to translate along an axial direction of the screw when the screw rotates, thereby driving the connecting rod to translate along the axial direction; and
   an anti-rotation element configured to cooperate with the movable element to prevent the movable element from rotating with the screw;
   wherein the motor and the screw are configured to be arranged parallel to each other on a same side of the gear assembly;
   wherein the anti-rotation element is configured as a slide rail, and the slide rail comprises a body extending along a longitudinal direction, wherein the body is provided with a slot extending along the longitudinal direction, and at least a portion of the movable element is provided in the slot.

2. The transmission mechanism for a base station antenna according to claim 1, wherein a ratio of a number of teeth of the second gear to a number of teeth of the first gear is configured to be greater than 1.

3. The transmission mechanism for a base station antenna according to claim 1, wherein the output end of the output shaft and the first end of the screw have a non-circular cross-section, and the first gear and the second gear each have central openings corresponding to the output end of the output shaft and the first end of the screw, respectively.

4. The transmission mechanism for a base station antenna according to claim 1, wherein the transmission mechanism further comprises a mounting plate, wherein at least one of the motor, the gear assembly, the support element and the anti-rotation element is fixedly mounted on the mounting plate.

5. The transmission mechanism for a base station antenna according to claim 4, wherein the gear assembly comprises a gear housing comprising a first housing portion for rotatably receiving the first gear and the second gear therein and a second housing portion for closing the gear housing.

6. The transmission mechanism for a base station antenna according to claim 5, wherein the mounting plate is provided with a first opening for receiving at least a portion of the gear assembly, two sides of the first opening have a first plate portion and a second plate portion, respectively, and two sides of the bottom of the gear assembly are provided with a first chute for receiving the first plate portion and a second chute for receiving the second plate portion, respectively.

7. The transmission mechanism for a base station antenna according to claim 4, wherein the mounting plate is provided with a second opening for receiving at least a portion of the support element.

8. The transmission mechanism for a base station antenna according to claim 7, wherein the second opening of the mounting plate comprises a longitudinal opening portion extending along a longitudinal direction of the mounting plate, a transverse opening portion extending along a transverse direction of the mounting plate, and an intermediate opening portion disposed between the longitudinal opening portion and the transverse opening portion and connecting the longitudinal opening portion and the transverse opening portion;
wherein the bottom of the support element is provided with a first positioning component extending vertically downward from a bottom surface of the support element and at least one second positioning component extending horizontally outward from a side surface of the support element, wherein at least a portion of the first positioning component is capable of being positioned in the longitudinal opening portion of the second opening of the mounting plate and at least a portion of the second positioning component is capable of being positioned in the transverse opening portion of the second opening of the mounting plate.

9. The transmission mechanism for a base station antenna according to claim 8, wherein the first positioning component comprises a vertically extending portion and a horizontally extending portion at one end of the vertically extending portion, wherein the horizontally extending portion of the first positioning component is capable of reaching below the mounting plate through the intermediate opening portion of the second opening of the mounting plate, and the vertically extending portion of the first positioning component is capable of being positioned in the longitudinal opening portion of the second opening of the mounting plate.

10. The transmission mechanism for a base station antenna according to claim 8, wherein the second positioning component is configured as a cantilevered elastic component and a free end of the second positioning component has a thickness greater than a thickness of a fixed end of the second positioning component, so that at least a portion of the free end of the second positioning component is capable of extending into the transverse opening portion of the second opening of the mounting plate.

11. The transmission mechanism for a base station antenna according to claim 1, wherein the bottom of the movable element is provided with a protrusion capable of extending into the slot, the protrusion is flat and a thickness of the protrusion is equal to a width of the slot.

12. The transmission mechanism for a base station antenna according to claim 4, wherein a bottom surface of the body is provided with one or more snap elements to snap the anti-rotation element on the mounting plate.

13. A transmission mechanism for a base station antenna, wherein the transmission mechanism comprises:
a motor having an output shaft;
a gear assembly comprising a first gear and a second gear meshed with each other, wherein an output end of the output shaft is connected to the first gear and drives the first gear to rotate;
a screw, wherein a first end of the screw is connected to the second gear and a second end of the screw is rotatably supported by a support element so that the screw is rotatable under driving of the second gear; and
a movable element mounted on the screw, the movable element being fixedly connected to one end of a connecting rod and configured to translate along an axial direction of the screw when the screw rotates, thereby driving the connecting rod to translate along the axial direction; and
a mounting plate, wherein at least one of the motor, the gear assembly, and the support element is fixedly mounted on the mounting plate;
wherein the motor and the screw are configured to be arranged parallel to each other on a same side of the gear assembly; and
wherein the mounting plate is provided with a first opening for receiving at least a portion of the gear assembly and a second opening for receiving at least a portion of the support element.

14. The transmission mechanism for a base station antenna according to claim 13, wherein two sides of the first opening of the mounting plate have a first plate portion and a second plate portion, respectively, and two sides of the bottom of the gear assembly are respectively provided with a first chute for receiving the first plate portion and a second chute for receiving the second plate portion.

15. The transmission mechanism for a base station antenna according to claim 13, wherein the second opening of the mounting plate comprises a longitudinal opening portion extending along a longitudinal direction of the mounting plate, a transverse opening portion extending along a transverse direction of the mounting plate, and an intermediate opening portion disposed between the longitudinal opening portion and the transverse opening portion and connecting the longitudinal opening portion and the transverse opening portion;
wherein the bottom of the support element is provided with a first positioning component extending vertically downward from a bottom surface of the support element and at least one second positioning component extending horizontally outward from a side surface of the support element; and
at least a portion of the first positioning component is capable of being positioned in the longitudinal opening portion of the second opening of the mounting plate and at least a portion of the second positioning component is capable of being positioned in the transverse opening portion of the second opening of the mounting plate.

16. The transmission mechanism for a base station antenna according to claim 15, wherein the first positioning component comprises a vertically extending portion and a horizontally extending portion at one end of the vertically extending portion, wherein the horizontally extending portion of the first positioning component is capable of reaching below the mounting plate through the intermediate opening portion of the second opening of the mounting plate, and the vertically extending portion of the first positioning component is capable of being positioned in the longitudinal opening portion of the second opening of the mounting plate; and wherein the second positioning component is configured as a cantilevered elastic component and a free end of the second positioning component has a thickness greater than a thickness of a fixed end of the second positioning component, so that at least a portion of the free end of the second positioning component is capable of extending into the transverse opening portion of the second opening of the mounting plate.

17. A transmission mechanism for a base station antenna, wherein the transmission mechanism comprises:

a motor having an output shaft;

a gear assembly comprising a first gear and a second gear meshed with each other, wherein an output end of the output shaft is connected to the first gear and drives the first gear to rotate;

a screw, wherein a first end of the screw is connected to the second gear and a second end of the screw is rotatably supported by a support element so that the screw is rotatable under driving of the second gear;

a movable element mounted on the screw, the movable element being fixedly connected to one end of a connecting rod and configured to translate along an axial direction of the screw when the screw rotates, thereby driving the connecting rod to translate along the axial direction; and an anti-rotation element configured to cooperate with the movable element to prevent the movable element from rotating with the screw;

wherein the motor and the screw are configured to be arranged parallel to each other on a same side of the gear assembly;

wherein the transmission mechanism further comprises a mounting plate, wherein at least one of the motor, the gear assembly, the support element and the anti-rotation element is fixedly mounted on the mounting plate; and wherein the gear assembly comprises a gear housing comprising a first housing portion for rotatably receiving the first gear and the second gear therein and a second housing portion for closing the gear housing.

* * * * *